United States Patent [19]

Sumikawa et al.

[11] Patent Number: 4,677,830
[45] Date of Patent: Jul. 7, 1987

[54] AIR CONDITIONING SYSTEM FOR AUTOMOTIVE VEHICLES

[75] Inventors: Seiji Sumikawa; Ichiro Noguchi, both of Konan, Japan

[73] Assignee: Diesel Kiki Co., Ltd., Tokyo, Japan

[21] Appl. No.: 774,760

[22] Filed: Sep. 11, 1985

[30] Foreign Application Priority Data

Sep. 17, 1984 [JP] Japan .................. 59-192607

[51] Int. Cl.$^4$ .............................. F25B 41/04
[52] U.S. Cl. .................... 62/126; 62/225; 62/228.3
[58] Field of Search ........ 62/212, 225, 228.3, 62/228.1, 204, 126, 129

[56] References Cited

U.S. PATENT DOCUMENTS

| | | | |
|---|---|---|---|
| 2,577,903 | 12/1951 | McGrath | 62/212 |
| 3,633,380 | 1/1972 | Pellizzetti | 62/228.3 |
| 3,686,892 | 8/1972 | Bassett, Jr. | 62/228.1 X |
| 3,702,064 | 11/1972 | Ciolli | 62/228.1 X |
| 4,133,186 | 1/1979 | Brucken et al. | 62/190 X |
| 4,463,573 | 8/1984 | Zeno et al. | 62/228.3 X |
| 4,463,576 | 8/1984 | Burnett et al. | 62/228.3 |
| 4,506,518 | 3/1985 | Yoshikawa et al. | 62/204 X |
| 4,523,435 | 6/1985 | Lord | 62/212 |
| 4,545,212 | 10/1985 | Noda | 62/212 X |
| 4,549,404 | 10/1985 | Lord | 62/228.3 X |

FOREIGN PATENT DOCUMENTS

51-1943  1/1976  Japan .

Primary Examiner—William E. Wayner
Attorney, Agent, or Firm—Frishauf, Holtz, Goodman & Woodward

[57] ABSTRACT

An air conditioning system for automotive vehicles wherein the temperature and pressure of refrigerant at the outlet of the evaporator are detected, respectively, by a temperature sensor and a pressure sensor, and the flow rate of refrigerant within the refrigerating cycle is controlled to proper values corresponding to thermal load on the system, by controlling the opening of an expansion valve with a valve control means responsive to output signals from the above sensors. The pressure of refrigerant detected by the pressure sensor is converted by conversion means into a corresponding saturation temperature of the refrigerant. Determining means determines whether or not the refrigerant quantity is insufficient by comparing the difference between the refrigerant temperature and the corresponding saturation temperature of the refrigerant with a predetermined reference value. Indicator means indicates abnormality when the refrigerant quantity is determined to be insufficient. The valve control means causes disengagement of the electromagnetic clutch of the compressor to render the refrigerant compressor inoperative when the refrigerant quantity is determined to be insufficient.

1 Claim, 3 Drawing Figures

AIR CONDITIONING SYSTEM FOR AUTOMOTIVE VEHICLES

BACKGROUND OF THE INVENTION

This invention relates to an air conditioning system for use in automotive vehicles, and more particularly to an air conditioning system of this kind which is adapted to prevent seizure of component parts of its compressor or like failure attributable to a shortage of refrigerant.

Conventionally, an air conditioning system for automotive vehicles has been proposed by Japanese Provisional Utility Model Publication (Kokai) No. 51-1943, which comprises a compressor driven by the automotive engine to compress the refrigerant, an electromagnetic clutch interposed between the driving shaft of the compressor and the output shaft of the engine, a condenser for cooling the refrigerant compressed by the compressor to liquefy same, an expansion valve for controlling the flow rate of the liquefied refrigerant to proper values corresponding to thermal load on the system, an evaporator for evaporating the liquefied refrigerant and thus cooling the air to be blown into the passenger compartment through heat exchange thereof with the refrigerant, a temperature sensor and a pressure sensor for detecting, respectively, the temperature and pressure of the refrigerant at an outlet of the evaporator, and a valve control means for controlling the opening of the expansion valve in response to output signals from the temperature sensor and the pressure sensor.

According to this conventional air conditioning system, the pressure and temperature of the refrigerant at the outlet of the evaporator are detected, and when the overheating degree determined from these detected values exceeds a certain value, the electromagnetic clutch is disengaged so as to prevent seizure of sliding parts of the compressor, while an alarm device is actuated. In this conventional system, the detected temperature of the refrigerant at the outlet of the evaporator is mechanically converted into corresponding pressure to be applied to one side surface of a diaphragm while the other side surface thereof is subjected to the detected pressure of the refrigerant at the outlet, and when the deflection of the diaphragm, corresponding to the difference between the two pressures, reaches a predetermined value, the electromagnetic clutch is disengaged, and an alarm device is actuated. However, this conventional system requires the provision of exclusive parts such as the diaphragm and oil passage conduits, thus being disadvantageous costwise.

SUMMARY OF THE INVENTION

It is an object of the invention to provide an air conditioning system for automotive vehicles which is equipped with a simply constructed economical protection means adapted to electrically detect overheating of refrigerant, and is therefore capable of preventing seizure of sliding parts of its compressor or like failure to be caused by a shortage of refrigerant.

It is a further object of the invention to provide an air conditioning system for automotive vehicles which is equipped with a more economical protection means wherein a parameter sensor for controlling the expansion valve is also used to control the compressor so as to prevent seizure of sliding parts of the latter.

According to the invention, there is provided an air conditioning system for automotive vehicles, which includes a compressor driven by an automotive engine to compress the refrigerant, an electromagnetic clutch interposed between the driving shaft of the compressor and the output shaft of the engine, a condenser for cooling the refrigerant compressed by the compressor to liquefy same, an expansion valve for controlling the flow rate of the liquefied refrigerant to proper values corresponding to thermal load on the system, an evaporator for evaporating the liquefied refrigerant to cool air to be blown into the passenger compartment through heat exchange thereof with the refrigerant, a temperature sensor and a pressure sensor for detecting, respectively, the temperature and pressure of the refrigerant at an outlet of the evaporator, and a valve control means for controlling the opening of the expansion valve in response to output signals from the temperature sensor and the pressure sensor.

The air conditioning system according to the invention is characterized by comprising: conversion means for converting the pressure of refrigerant detected by the pressure sensor to a corresponding saturation temperature of the refrigerant; determining means for determining whether or not the quantity of the referigerant circulating in the air conditioning system is smaller than a required value through comparison of the difference between the temperature of refrigerant detected by the temperature sensor and the corresponding saturation temperature of the refrigerant obtained by the conversion with a predetermined reference value; indicator means for indicating the existence of an abnormality when the determining means determines that the quantity of the refrigerant is smaller than the required value; and means for interrupting power transmission from the engine to the compressor by disengaging the electromagnetic clutch when the determining means determines that the quantity of the refrigerant is smaller than the required value.

The above objects, features and advantages of the invention will be more apparent from the ensuing detailed description taken in connection with the accompanying drawings.

DETAILED DESCRIPTION

The invention will now be described in detail with reference to the drawings.

Figure 1:
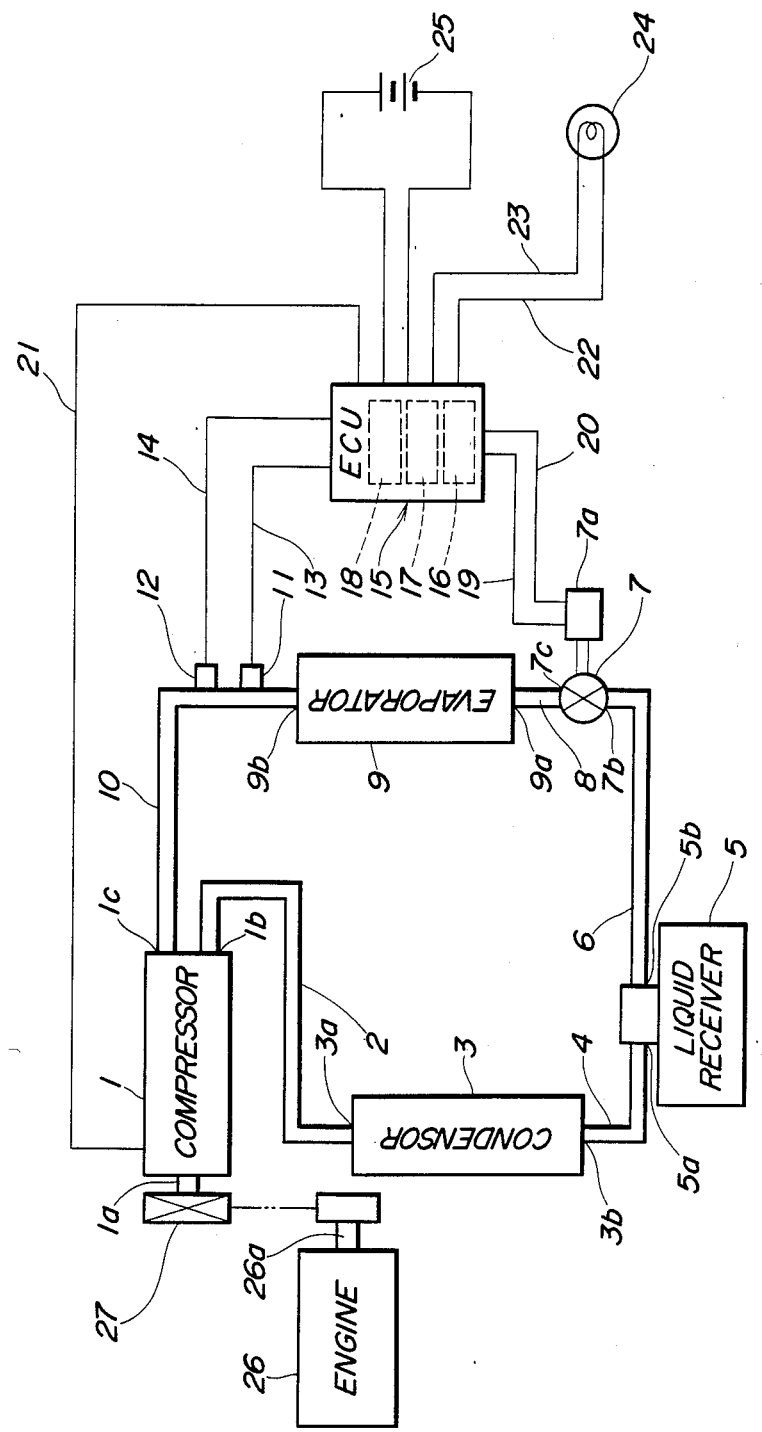
FIG. 1 is a schematic block diagram of an embodiment of an air conditioning system for automotive vehicles of the invention.

Referring first to FIG. 1 schematically illustrating an air conditioning system for automotive vehicles, according to the invention, reference numeral 1 designates a compressor, whose driving shaft 1a is connected to an output shaft 26a of an automotive engine 26 via an electromagnetic clutch 27. An outlet port 1b of the compressor communicates with an inlet port 3a of a condenser 3 by way of a conduit line 2. An outlet port 3b of the condenser 3 communicates by way of a conduit line 4 with an inlet port 5a of a liquid receiver 5, whose outlet port 5b is in communication via a conduit line 6 with an inlet port 7b of an expansion valve 7 which controls the flow rate of the refrigerant to be cooled to become liquefied by the condenser 3 in response to a control signal from an electronic control unit 15, referred to later. An outlet port 7c of the expansion valve 7 is connected via a conduit line 8 to an inlet port 9a of an evaporator 9, whose outlet port 9b is connected to an inlet port 1c of the compressor 1 via a conduit line 10. The compressor 1, the condenser 3, the liquid receiver 5, the expansion valve 7, the evaporator 9 and the conduit lines 2, 4, 6, 8, and 10 connecting between them cooperate to constitute a refrigerating cycle. A temperature sensor 11 and a pressure sensor 12 are provided in the conduit line 10 in the vicinity of the outlet port 9b of the evaporator 9, and serve to detect, respectively, the temperature T1 and the pressure P of the refrigerant in the conduit line 10 near the outlet port 9b of the evaporator 9, of which output signals are supplied to the electronic control unit 15 through signal lines 13 and 14, respectively. The electronic control unit 15 is equipped with a valve control means 16 for controlling the opening of the expansion valve 7 in response to output signals from the temperature sensor 11 and the pressure sensor 12, conversion means 17 for converting the refrigerant pressure P detected by the pressure sensor 12 to a corresponding saturation temperature T2 of the refrigerant, and determining means 18 for determining whether or not the quantity of refrigerant circulating in the refrigerating cycle of the air conditioning system is insufficient by comparing the difference Δt between the refrigerant temperature T1 detected by the temperature sensor 11 and the corresponding saturation temperature T2 of the refrigerant with a predetermined reference value T0. Output terminals of the valve control means 16 are electrically connected to input terminals of an actuator 7a for the expansion valve 7 via signal lines 19 and 20. A solenoid (not shown) of the electromagnetic clutch 27 is electrically connected by a signal line 21 to the electronic control unit 15, so that when the determining means 18 determines that the refrigerant quantity is insufficient, the valve control means 16 deenergizes the solenoid to thereby disengage the electromagnetic clutch 27 whereupon the power transmission from the engine 26 to the compressor 1 is interrupted to render the latter inoperative. Further, indicator means 24 comprising an indicator lamp is electrically connected by signal lines 22 and 23 to the electronic control unit 15, so that when the determining means 18 determines that the refrigerant quantity is insufficient, the electronic control unit 15 causes the indicator lamp of the indicator means 24 to light up to indicate abnormality. In FIG. 1, reference numeral 25 designates a power supply electrically connected to the control unit 15.

Figure 2:
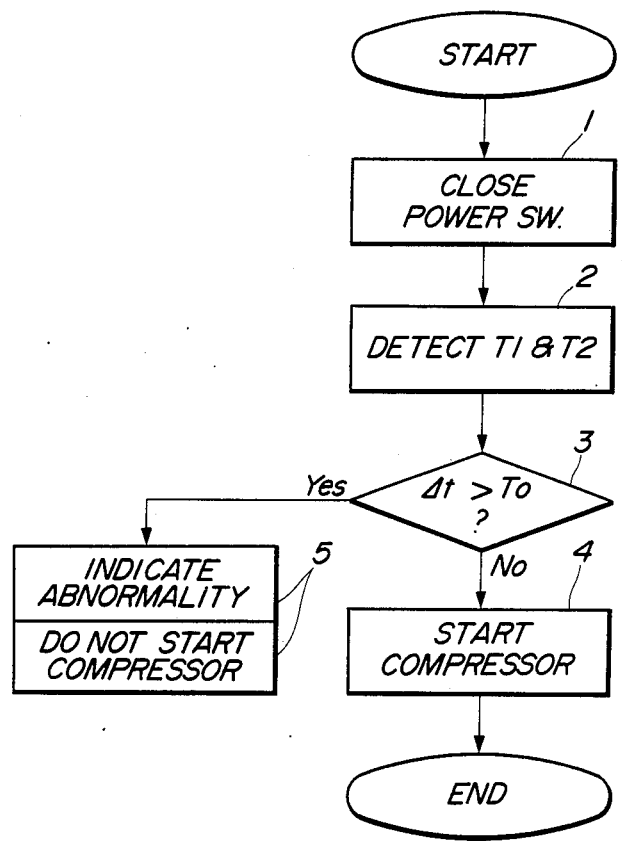
FIG. 2 is a flow chart showing a manner of detecting the refrigerant quantity and controlling the compressor according to the invention.

Now, the manner of detecting the refrigerant quantity in the air conditioning system for automotive vehicles as well as the manner of controlling the compressor will be described with reference to the flow chart in FIG. 2 as well as to FIG. 1. Referring to Fig. 2, the power switch for the air conditioning system is closed at step 1, followed by execution of step 2 wherein the temperature T1 and the pressure P of the refrigerant in the vicinity of the outlet port 9b of the evaporator 9 are detected, respectively, by the temperature sensor 11 and the pressure sensor 12, which then supply the control unit 15 with output signals representative of the temperature T1 and the pressure P through respective signal lines 13 and 14. The signal value of pressure P is converted by the conversion means 17 into a corresponding value of the saturation temperature T2 of the refrigerant. In step 3 it is determined by the determining means 18 whether or not the quantity of refrigerant circulating in the refrigerating cycle is insufficient, i.e., whether the quantity is smaller than a predetermined required value through comparing the difference Δt between the refrigerant temperature T1 and the corresponding saturation temperature T2 of the refrigerant with a predetermined reference value T0. If Δt is determined to be smaller than the predetermined reference value T0, step 4 is executed wherein the solenoid of the electromagnetic clutch 27 of the compressor 1 is energized to engage the electromagnetic clutch 27 so that the driving torque of the engine 26 is transmitted to the compressor 1 to start the same and accordingly the air condioning operation. On the other hand, if the difference Δt is determined to be greater than the reference value T0 in step 3, step 5 follows wherein the indicator lamp of the indicator means 24 is lit up to inform an abnormal condition and at the same time the solenoid of the electromagnetic clutch 27 is deenergized to disengage the electromagnetic clutch 27 so that the driving torque of the engine 26 is not transmitted to the compressor 1, which hence is not started.

As described above, according to the invention, it is determined, immediately before starting of the compressor 1, whether or not the quantity of refrigerant in the refrigerating cycle is insufficient, and in the case of insufficiency of the refrigerant the compressor 1 is rendered inoperative. Therefore, the compressor 1 is prevented from having failure such as seizure of sliding parts thereof attributable to a shortage of refrigerant.

When a sufficient amount of refrigerant is contained in the refrigerating cycle, i.e., the refrigerant is in a saturated state within the cycle, the temperature T1 of refrigerant near the outlet of the evaporator 9 is equal to the saturation temperature T2 corresponding to the outlet refrigerant pressure from the evaporator 9 so long as the refrigerating cycle is out of operation. However, in the case that the refrigerant is insufficient, or, in the extreme case that almost no refrigerant is present in the cycle, if the ambient temperature is 30° C., the temperature T1 detected by the temperature sensor 11 will be about 30° C. and the pressure P detected by the pressure sensor 12 will be zero, while the refrigerating cycle is out of operation. The zero pressure is converted to a corresponding value of the saturation temperature T2, e.g. −30° C. in the case of a refrigerant of grade R-12, whereby the temperature difference Δt is 60° C. It follows from this that if the reference value T0 is set to a value corresponding to the required quantity of the refrigerant in relation to the value Δt (=T1−T2), it can be easily determined whether the refrigerant quantity is sufficient, by merely comparing between the values T0 and Δt.

As described above, according to the invention, a parameter signal detected as an input signal for controlling the expansion valve 7 is also employed as an input parameter signal for protecting the compressor 1. Therefore, the protection means for protecting the compressor 1 according to the invention can be simple in construction and inexpensive.

Now, the manner of detecting the refrigerant quantity and controlling the compressor according to a second embodiment of the invention will be described with reference to the flow chart in FIG. 3 as well as to FIG. 1. The second embodiment differs from the first embodiment in that the determination of a shortage of the refrigerant is made after the start of the compressor 1.

Figure 3:
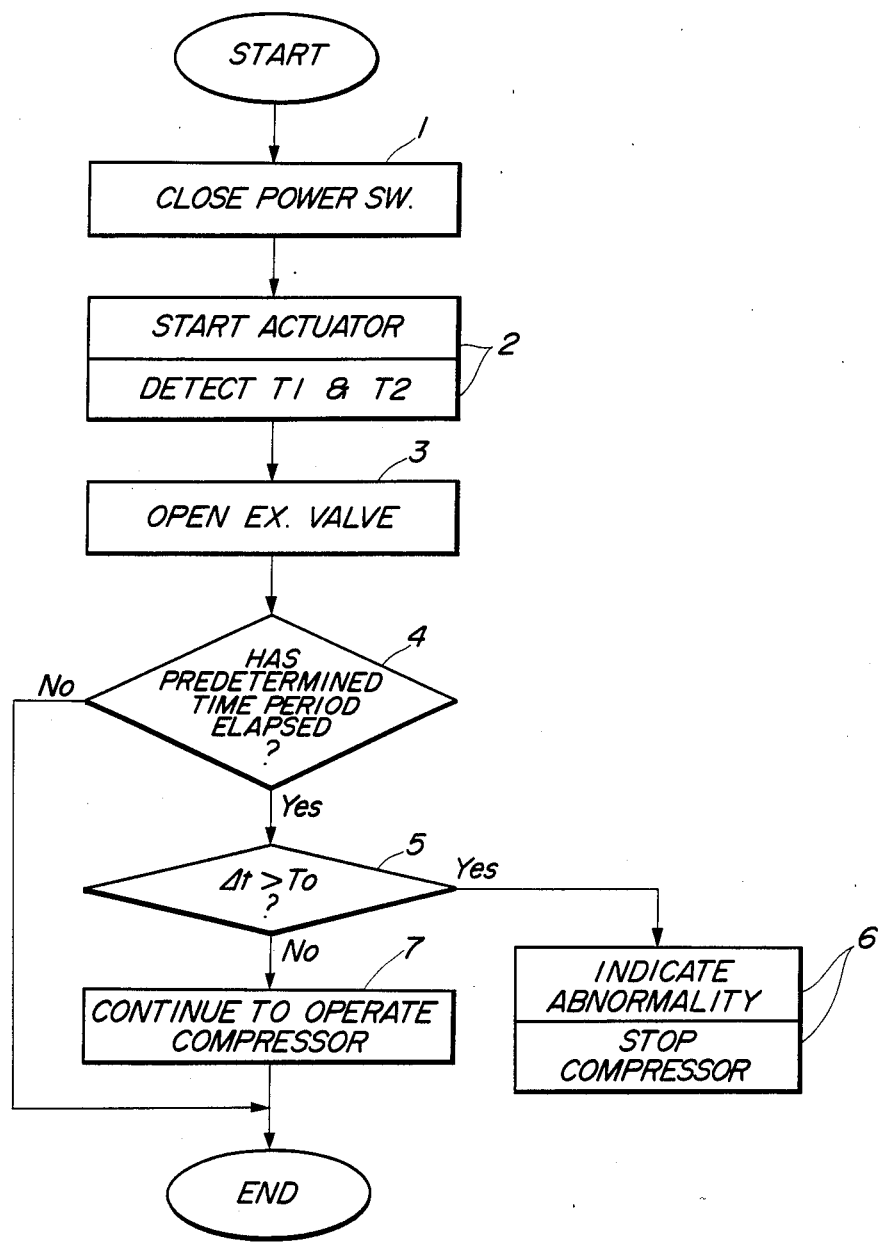
FIG. 3 is a flow chart similar to FIG. 2, showing a second embodiment of the invention.

Referring to FIG. 3 showing the procedure of the second embodiment, in step 1 the power switch for the air conditioning system is closed, followed by execution of step 2 whereat the compressor 1 is started and the temperature T1 and the pressure P of refrigerant in the vicinity of the outlet port 9b of the evaporator 9 are detected, respectively, by the temperature sensor 11 and the pressure sensor 12, which then supply the control unit 15 with output signals representative of the temperature T1 and the pressure P, the latter being converted by the conversion means 17 into a corresponding value of the saturation temperature T2 of the refrigerant. In step 3 the opening of the expansion valve 7 is controlled to a required degree based on the signals outputted by the temperature sensor 11 and the pressure sensor 12, and after a lapse of a predetermined period of time which is counted down by a program timer in step 4, the program proceeds to step 5 wherein it is determined by the determining means 18 whether or not the quantity of refrigerant in the refrigerating cycle is smaller than a predetermined required value through comparing between the values Δt and T0. If it is determined affirmatively, the program proceeds to step 6 wherein the indicator lamp of the indicator means 24 is lit up to inform an abnormal condition and at the same time the electromagnetic clutch 27 is disengaged so that the compressor 1 ceases to operate. On the other hand, if the determination is negative, step 7 is executed whereby the compressor 1 continues operating.

What is claimed is:

1. In an air conditioning system for an automotive vehicle having a passenger compartment, including a compressor having a driving shaft driven by an automotive engine having an output shaft to compress refrigerant circulating in said system, an electromagnetic clutch interposed between said driving shaft of said compressor and said output shaft of said engine, a condenser for cooling the refrigerant compressed by said compressor to liquefy same, an expansion valve for controlling the flow rate of the liquefied refrigerant to proper values corresponding to thermal load on said air conditioning system, an evaporator for evaporating the liquefied refrigerant to cool air to be blown into said passenger compartment through heat exchange thereof with the refrigerant, a temperature sensor and a pressure sensor for detecting, respectively, the temperature and pressure of the refrigerant at an outlet of said evaporator, and an expansion valve control means for controlling the opening of said expansion valve in response to output signals from said temperature sensor and said pressure sensor, the improvement comprising:

electronic control means in which said expansion valve control means is provided, said electronic control means including conversion means for electrically converting the pressure of refrigerant detected by said pressure sensor to a corresponding saturation temperature of the refrigerant, and determining means for electronically determining whether or not the quantity of the refrigerant in said air conditioning system is smaller than a required valve through comparison of the difference between the temperature of the refrigerant detected by said temperature sensor and the corresponding saturation temperature of the refrigerant obtained by the conversion by said conversion means with a predetermined reference value, said determining means including means for determining whether or not the quantity of the refrigerant is smaller than said required quantity immediately after the start of said compressor; and indicator means controlled by said electronic control means for indicating the existence of an abnormality when said determining means determines that the quantity of the refrigerant is smaller than said required value;

said expansion valve control means also being operable to interrupt power transmission from said engine to said compressor by disengaging the electromagnetic clutch when said determining means determines that the quantity of the refrigerant is smaller than said required value.

* * * * *